(12) United States Patent
Flisek et al.

(10) Patent No.: US 11,951,958 B2
(45) Date of Patent: Apr. 9, 2024

(54) PISTON TUBE ASSEMBLY FOR A SPRING BRAKE ACTUATOR, AND SPRING BRAKE ACTUATOR

(71) Applicant: ZF CV Systems Europe BV, Brussels (BE)

(72) Inventors: Filip Flisek, Zgorzelec (PL); Waldemar Talko, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 17/611,507

(22) PCT Filed: May 16, 2019

(86) PCT No.: PCT/EP2019/062647
§ 371 (c)(1),
(2) Date: Nov. 15, 2021

(87) PCT Pub. No.: WO2020/228958
PCT Pub. Date: Nov. 19, 2020

(65) Prior Publication Data
US 2022/0212650 A1  Jul. 7, 2022

(51) Int. Cl.
*B60T 17/08* (2006.01)
*B60T 17/00* (2006.01)

(52) U.S. Cl.
CPC .......... *B60T 17/083* (2013.01); *B60T 17/086* (2013.01)

(58) Field of Classification Search
CPC ........................... B60T 17/083; B60T 17/086
See application file for complete search history.

(56) References Cited

U.S. PATENT DOCUMENTS

| | | | |
|---|---|---|---|
| 5,623,863 A | 4/1997 | Plantan | |
| 7,963,210 B2 * | 6/2011 | Lanquetot | B60T 17/086 91/363 R |
| 8,011,483 B2 | 9/2011 | Brandt et al. | |
| 9,238,455 B2 * | 1/2016 | Park | B60T 17/086 |
| 9,487,203 B2 * | 11/2016 | Park | B60T 17/083 |
| 2004/0060784 A1 * | 4/2004 | Gravier | B60T 17/086 188/170 |

(Continued)

FOREIGN PATENT DOCUMENTS

| | | |
|---|---|---|
| CN | 1665709 A | 9/2005 |
| CN | 102159437 A | 8/2011 |

(Continued)

*Primary Examiner* — Melody M Burch
(74) *Attorney, Agent, or Firm* — Dickinson Wright PLLC

(57) ABSTRACT

A piston tube assembly (17) for a spring brake actuator (1) includes a first tubular body (35) having a contoured inside surface profile (55) for non-rotationally guiding a running nut (21) of a mechanical release mechanism (19, 21), and an internal breather valve (41) mounted to the piston tube assembly (17) for allowing fluid transport into and out of the piston tube assembly and any volume in fluid communication therewith. The piston tube assembly (17) includes a second tubular body (37) that is of a different material than the first tubular body (35), which encloses the first tubular body (35) and mechanically supports the first tubular body (35), and the internal breather valve (41) is mounted to the first tubular body (35).

20 Claims, 3 Drawing Sheets

(56) References Cited

U.S. PATENT DOCUMENTS

2006/0280889 A1* 12/2006 Powell .................... B32B 1/08
428/36.9
2013/0075211 A1* 3/2013 Plantan .................. F16D 65/28
188/170
2016/0304073 A1* 10/2016 Hericher ............... B60T 17/086

FOREIGN PATENT DOCUMENTS

| CN | 203907069 U | * | 10/2014 | |
|---|---|---|---|---|
| CN | 105980225 A | | 9/2016 | |
| CN | 207005154 U | | 2/2018 | |
| EP | 2469142 A1 | * | 6/2012 | ............. B21C 37/28 |
| EP | 2568206 B1 | * | 1/2015 | ............ F16L 13/143 |
| EP | 3093207 A1 | * | 11/2016 | |
| WO | WO-03080417 A1 | * | 10/2003 | ............ B60T 17/083 |
| WO | 2007012489 A1 | | 2/2007 | |
| WO | 2010049021 A1 | | 5/2010 | |
| WO | WO-2012055632 A1 | * | 5/2012 | ........... B60R 16/027 |
| WO | 2015172862 A1 | | 11/2015 | |

* cited by examiner

PISTON TUBE ASSEMBLY FOR A SPRING BRAKE ACTUATOR, AND SPRING BRAKE ACTUATOR

FIELD

The present invention relates to a piston tube assembly for a spring brake actuator. More particularly, the present invention relates to piston tube assembly including a tubular body having a contoured inside profile for non-rotationally guiding a running nut of a mechanical release mechanism, and an internal breather valve mounted to the piston tube assembly for allowing fluid transport into and out of the piston tube and any volume in fluid communication therewith.

BACKGROUND

Piston tubes are known in the industry as an essential part of a spring brake actuator. The piston tube is often integrally formed or alternatively permanently connected to a spring guiding portion of a spring brake piston, which is actuated by either a compression spring in the spring brake actuator or positive pressure in an adjacent pressure chamber. The piston tube itself is responsible for transmitting the brake force applied by the compression spring to either an external brake mechanism or a further functional module of a spring brake actuator, such as a service brake portion.

Known piston tube assemblies, while functioning generally satisfactorily, face the challenge of having to undergo a comparatively complicated manufacturing procedure. If the piston tube is integrally formed with the remaining structure of the spring brake actuator, complicated molding forms need to be provided, or complicated machining procedures need to be conducted.

Also, known piston tubes that are provided in the form of piston tube assemblies—which are separate parts that have to be permanently fastened to the spring brake piston structure—have a comparatively complicated layout.

SUMMARY

With that in mind, it was an object of the invention to provide a piston tube assembly of the initially mentioned type that is more cost efficient to manufacture without sacrificing functionality.

In one aspect, the object is achieved by providing a piston tube assembly having a tubular body that is a first tubular body, and the piston tube assembly further includes a second tubular body that is of a different material than the first tubular body, encloses the first tubular body, and mechanically supports the first tubular body, wherein an internal breather valve is mounted to the first tubular body. The invention is based upon the realization that while counter-intuitive, it is surprisingly more cost efficient to replace a monolithic tubular body with two distinct tubular bodies engaging one another. Firstly, both separate tubular bodies can be manufactured at lower cost respectively as compared to a more complicated monolithic tubular body. Secondly, the second, outer tubular body may be selected to be of a stronger material than the first tubular body such that the different functionalities required in the piston tube can be distributed among the two tubular bodies. According to the approach of the present disclosure, the functionality of the original monolithic tubular body of the prior art may be preserved or even enhanced. In a preferred embodiment, according to an aspect, the second tubular body consists partially or completely of steel, and the first tubular body consists partially or completely of a nonmetallic component, preferably a polymer. The polymeric tubular body has the advantage of having a low friction coefficient, which leads to an improved slidable guiding of the running nut of the mechanical release mechanism. The torque transfer asserted by the running nut is handled by the first tubular body and transferred to the second tubular body. In order to achieve this, the second tubular body preferably engages the first tubular body in a torque-transmitting connection, in particular in a positive connection such as by mutually engaging mating geometries, such as groove and tongue, or snap-fit connectors. Alternatively or additionally, the connection may also be a non-positive connection such as one by frictional engagement, particularly preferred by thread engagement or press fitting.

In a further preferred embodiment, according to an aspect, the first tubular body includes a head section, and the head section includes a recess for accommodating the internal breather valve, and preferably at least one lateral ventilation hole opening into the recess for the internal breather valve.

In a further preferred embodiment, according to an aspect, the contour of the inside profile of the first tubular body is polygonal, preferably rectangular, pentagonal, hexagonal, heptagonal, or octagonal.

In a further preferred embodiment, according to an aspect, at least one of the tubular bodies has a circular outside profile.

The invention has been described above in a first aspect with respect to a piston tube assembly. According to a second aspect, the invention also achieves the object mentioned above by providing a spring brake actuator for a commercial vehicle, including: a cylinder housing having a housing base, a spring brake piston located inside the cylinder housing, a compression spring located inside the cylinder housing between the housing base and the spring brake piston, the compression spring effective to push the spring brake piston away from the housing base, the spring brake piston being adapted to transmit a brake force exerted by the compression spring, and wherein the spring brake piston includes a piston tube assembly according to any one of the preferred embodiments described above.

The spring brake actuator shares the same benefits and preferred embodiments of the piston tube assembly described above. Preferred embodiments of the piston tube assembly are therefore also preferred embodiments of the spring brake actuator and vice versa, such that reference is made to the description of the preferred embodiments of the piston tube described above in order to prevent unnecessary repetitions.

BRIEF DESCRIPTION OF THE DRAWINGS

For a more complete understanding of the invention, the invention will now be described in more detail with reference to the accompanying drawings.

In brief, the figures to which reference will be made are as follows.

DETAILED DESCRIPTION

The detailed description will illustrate and describe, or is considered as a preferred embodiment, of the invention. It should of course be understood that various modifications and changes in form or detail could readily be made without departing from the scope of the invention. It is therefore intended that the invention may not be limited to the exact form and detail shown and described herein, nor to anything less than the whole of the invention disclosed herein. Further, the features described in the description, the drawings, and the claims disclosing the invention may be a part of the invention when considered alone or in combination. In particular, any reference signs in the claims shall not be construed as limiting the scope of the invention. The word "comprising" does not exclude other elements or steps. The wording "a" or "an" does not exclude a plurality.

Figure 1:
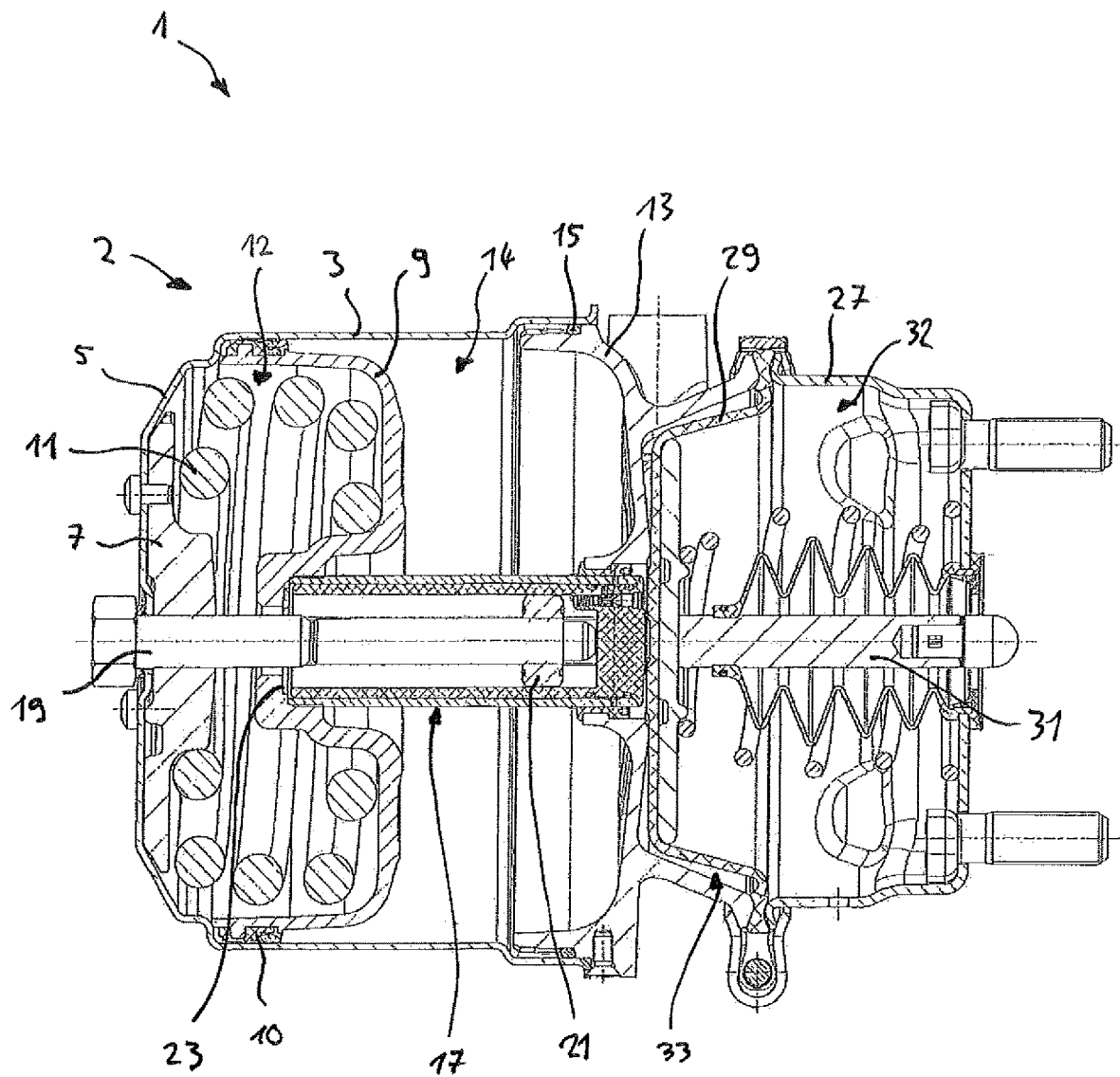
FIG. 1 illustrates a schematic cross-sectional view of a spring brake actuator according to an aspect of the invention.

In FIG. 1, a spring brake actuator 1 for a commercial vehicle is depicted. The spring brake actuator 1 includes a cylinder housing 2 having a first housing part 3 and a cylinder housing base 5. On the cylinder housing base 5, a spring seat 7 is located. Inside the cylinder housing 3, a spring brake piston 9 is slidably arranged. A compressions spring 11 is interposed between the spring seat 7 and the spring brake piston 9 and is effective to push the spring brake piston 9 away from the housing base 5.

The spring brake piston 9 separates the interior of the cylinder housing 2 into a spring chamber 12 and a pressure chamber 14. A sealing element 10 slidably rests against the inside wall of the first housing part 3.

The first housing part 3 is connected to a second housing part 13, which in the present embodiment is a flange connector. The first housing part 3 and the second housing part 13 are sealingly connected through a sealing element 15, for example an O-ring.

The spring brake piston 9 includes a piston tube assembly 17. Inside the piston tube assembly 17, a mechanical release bolt 19 is rotatably housed and is effective to drive a running nut 21 for mechanically releasing and tensioning the compression spring 11. The running nut 21 is configured to engage a corresponding stop shoulder 23 of the spring brake piston 9.

Inside the piston tube assembly 17, an internal breather valve assembly 25 is located and is effective to allow for fluid transport through the piston tube assembly 17.

The spring brake actuator 1 further includes a third housing part 27, which is connected to the second housing part 13. The spring brake actuator 1 includes a flexible diaphragm 29 which is sealingly located between the second housing part 13 and the third housing part 27 and is preferably mounted thereto by way of clamping, e.g. crimping.

The flexible diaphragm 29 separates the interior volume defined by the second housing part 13 and the third housing part 27 into a service brake chamber 32 and a working chamber 33. The second housing part 13 includes a recess configured to allow a reciprocating movement of the piston tube assembly 17 into the interior defined between the second housing part 13 and the third housing part 27, thereby manipulating the volume of the working chamber 33 and service brake chamber 32. The piston tube assembly 17 comprises a front face 59 that pushes against the flexible diaphragm 29, which in turn transmits the brake force applied to it to a push rod 31, which can be connected to an external brake mechanism.

Figure 2A:
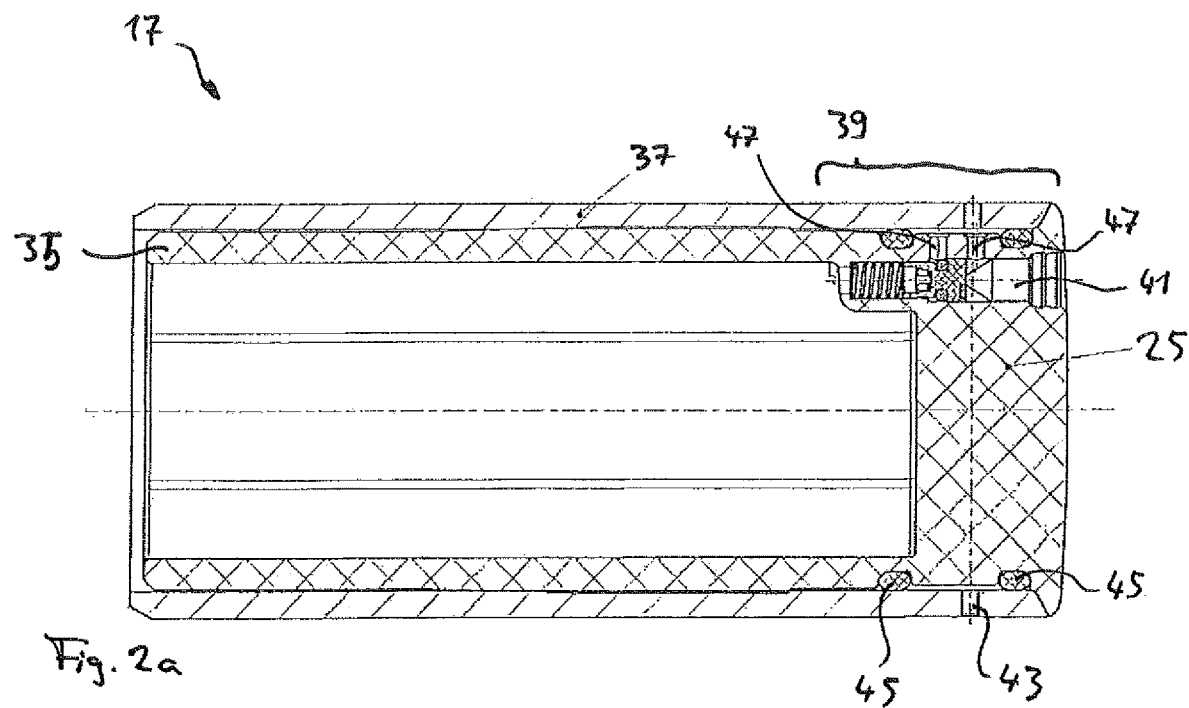
FIG. 2a is a schematic cross-sectional view of a piston tube assembly for the spring brake actuator of FIG. 1.

Details of the piston tube assembly 17 are shown in FIG. 2a, b.

Figure 2B:
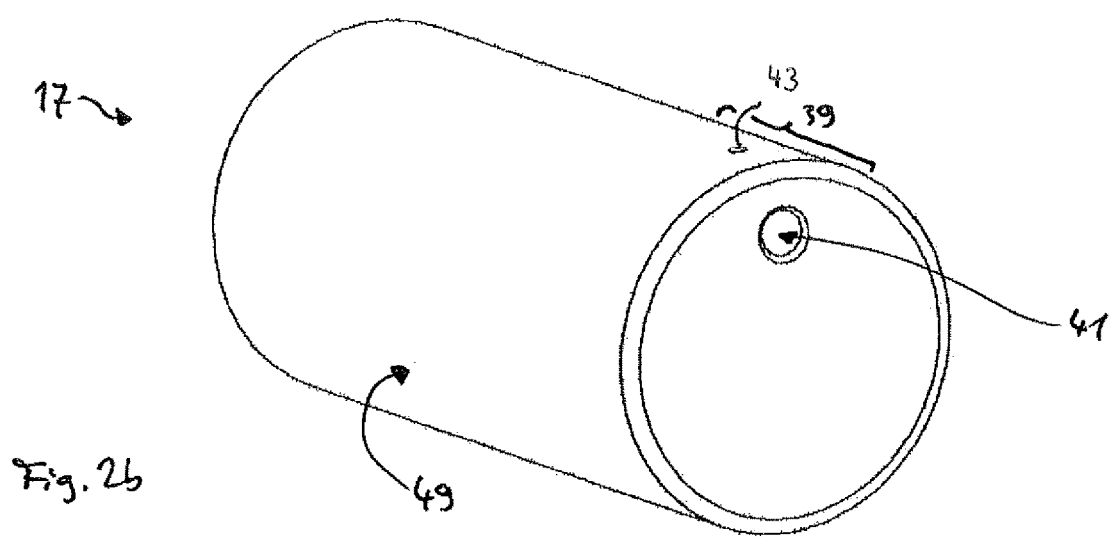
FIG. 2b is a perspective view of the piston tube assembly.

In FIGS. 2a and 2b, it is shown that the piston tube assembly 17 includes a first tubular body 35 mounted inside a second tubular body 37. Preferably, the first tubular body 35 consists of a polymer, wherein the second tubular body 37 consists of steel. The first tubular body 35 comprises a head section 39 in which the internal breather valve assembly 25 is located. In the state shown in FIG. 2a, an internal breather valve 41 is mounted inside the internal breather valve assembly 25. The internal breather valve assembly 25 communicates with the environment through a number of lateral ventilation holes 47, which open into an annular space that is in fluid communication with a further lateral opening 43 provided in the second tubular body 37. Preferably, a number of sealing elements, such as O-rings 45, are positioned in spaced-apart relationship next to the lateral opening 43.

As can be seen from FIG. 2b, the second tubular body 37 preferably has a circular or cylindrical outside profile 49.

Figure 3A:
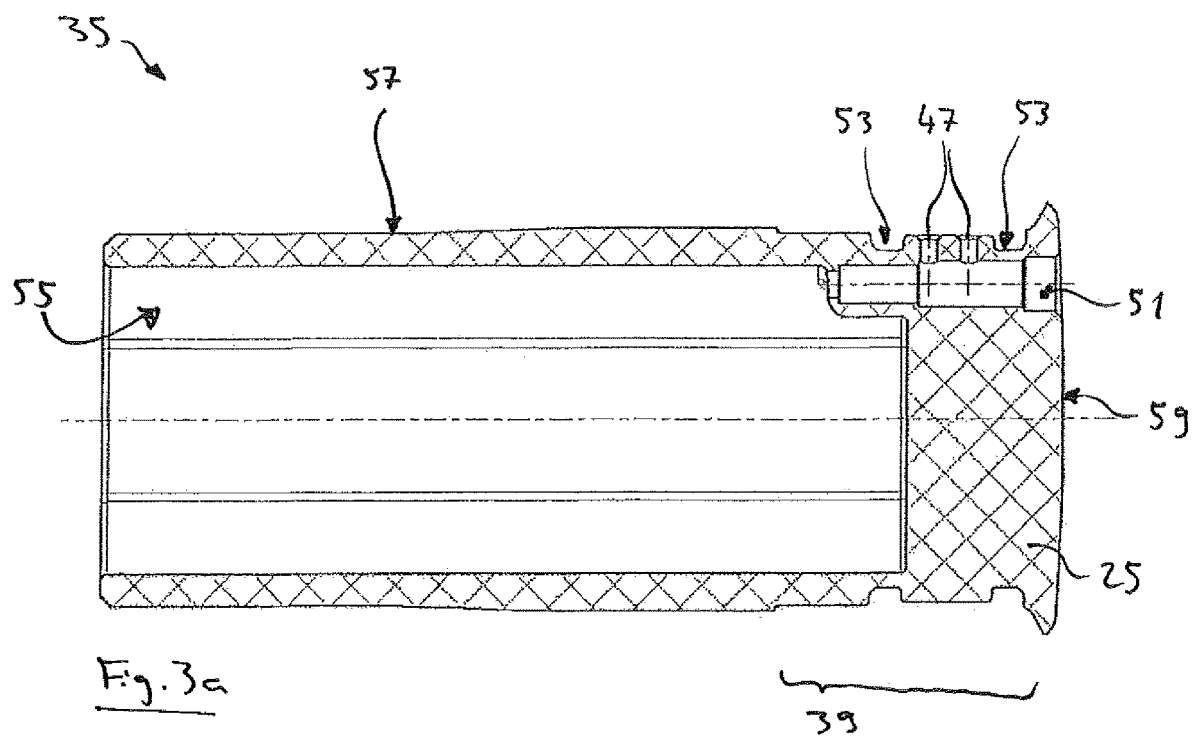
FIG. 3a is a cross-sectional view of a first tubular body of the piston tube assembly.

As can further be seen from FIG. 3a, b, the first tubular body 35 comprises a recess 51 sized to accommodate the internal breather valve 41 therein. Preferably, the internal breather valve 41 is built in accordance with U.S. Pat. No. 8,011,483 B2. Adjacent to the lateral ventilation holes 47, the first tubular body 35 preferably includes a number of annular recesses 57 for accommodating correspondingly shaped sealing elements such as the O-rings 45 shown in FIG. 2a.

Adjacent to the head section 39, the first tubular body 35 preferably comprises a pressing section 57 which is sized for being press-fitted into the second tubular body 37 and has a correspondingly selected outside diameter and surface roughness, depending on the corresponding inside surface of the second tubular body 37 and the desired tightness of the press fit.

Figure 3B:
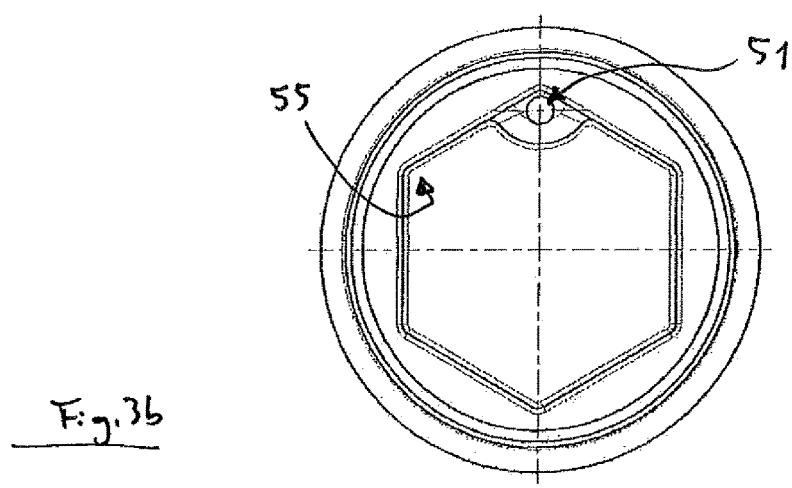
FIG. 3b is an end view of the first tubular body.

As can further be seen from FIG. 3b, the inside surface profile 55 of the first tubular body 35 has a polygonal shape, in this example a hexagonal shape, for non-rotationally guiding the running nut 21 along piston tube assembly 17.

The invention claimed is:

1. A piston tube assembly (17) for a spring brake actuator (1), the piston tube assembly (17) comprising:
   a first tubular body (35) having a contoured inside surface profile (55) for non-rotationally guiding a running nut (21) of a mechanical release mechanism (19, 21), and
   an internal breather valve (41) mounted to the piston tube assembly (17) for allowing fluid transport into and out of the piston tube assembly (17) and any volume in fluid communication therewith,
   wherein the piston tube assembly (17) further comprises a second tubular body (37) that is made of a different material than the first tubular body (35),
   wherein the second tubular body encloses the first tubular body (35) and mechanically supports the first tubular body (35),
   wherein the internal breather valve (41) is mounted to the first tubular body (35);
   wherein the first tubular body (35) includes a head section (39) and a recess (51) disposed in the head section (39) for accommodating the internal breather valve (41).

2. The piston tube assembly (17) of claim 1, wherein the second tubular body (37) is partially or completely made of steel, and the first tubular body (35) is partially or completely made of a nonmetallic material.

3. The piston tube assembly (17) of claim 1, wherein the second tubular body (37) engages the first tubular body (35) in a torque-transmitting connection.

4. The piston tube assembly (17) of claim 1,
wherein a shape of the contoured inside surface profile (55) of the first tubular body (35) is polygonal.

5. The piston tube assembly (17) of claim 1,
wherein at least one of the first or second tubular bodies (37, 35) has a circular outside profile (49).

6. A spring brake actuator (1) for a commercial vehicle, the spring brake actuator comprising:
a cylinder housing (2) having a housing base (5),
a spring brake piston (9) disposed inside the cylinder housing (2),
a compression spring (11) disposed inside the cylinder housing (2) between the housing base (5) and the spring brake piston (9), wherein the compression spring is effective to push the spring brake piston (9) away from the housing base (5), the spring brake piston (9) configured to transmit a brake force exerted by the compression spring (12), and
a piston tube assembly (17) comprising:
a first tubular body (35) having a contoured inside surface profile (55) for non-rotationally guiding a running nut (21) of a mechanical release mechanism (19, 21), and
an internal breather valve (41) mounted to the piston tube assembly (17) for allowing fluid transport into and out of the piston tube assembly (17) and any volume in fluid communication therewith,
a second tubular body (37) that is made of a different material than the first tubular body (35),
wherein the second tubular body encloses the first tubular body (35) and mechanically supports the first tubular body (35),
wherein the internal breather valve (41) is mounted to the first tubular body (35);
wherein the second tubular body is longer than the contoured inner surface profile of the first tubular body;
wherein the first tubular body (35) includes a head section (39) and a recess (51) disposed in the head section (39) for accommodating the internal breather valve (41).

7. The spring brake actuator of claim 6,
wherein the second tubular body (37) is partially or completely made of steel, and the first tubular body (35) is partially of completely made of a nonmetallic material.

8. The spring brake actuator of claim 6,
wherein the second tubular body is axially fixed relative to the first tubular body;
wherein the second tubular body (35) engages the first tubular body (35) in a torque-transmitting connection.

9. The piston tube assembly of claim 1, wherein the first tubular body (35) includes at least one lateral ventilation hole (47) opening into the recess (51) for the internal breather valve (41).

10. The piston tube assembly of claim 3, wherein the torque-transmitting connection is a positive connection.

11. The piston tube assembly of claim 10, wherein the positive connection includes mutually engaging mating geometries, wherein the mating geometries include at least one of groove and tongue or snap-fit connectors.

12. The piston tube assembly of claim 3, wherein the torque-transmitting connection is a non-positive connection having frictional engagement.

13. The piston tube assembly of claim 12, wherein the frictional engagement includes one of thread engagement or press fitting.

14. The piston tube assembly of claim 2, wherein the nonmetallic material is a polymer.

15. The piston tube assembly of claim 9, wherein the at least one lateral ventilation hole is in fluid communication with an annular space disposed between the first tubular body and the second tubular body.

16. The piston tube assembly of claim 15, wherein the annular space is in fluid communication with at least one lateral opening provided in the second tubular body, wherein fluid can pass through the at least one lateral opening, the annular space, and the at least one lateral ventilation hole from outside of the piston tube assembly.

17. The piston tube assembly of claim 16, further comprising sealing elements (45) disposed between the first tubular body and the second tubular body and on opposite axial sides of the at least one lateral-opening and the at least one lateral ventilation-hole to define a sealed fluid path from the at least one lateral opening to the at least one lateral ventilation hole via the annular space.

18. The piston tube assembly of claim 1, wherein the first tubular body includes a pressing section that is axially adjacent the head section, wherein the pressing section is sized and arranged to be received in and mate with a corresponding section of the second tubular body.

19. The piston tube assembly of claim 1, wherein the second tubular body is axially fixed relative to the first tubular body.

20. A piston tube assembly (17) for a spring brake actuator (1), the piston tube assembly (17) comprising:
a first tubular body (35) having a contoured inside surface profile (55) for non-rotationally guiding a running nut (21) of a mechanical release mechanism (19, 21), and
an internal breather valve (41) mounted to the piston tube assembly (17) for allowing fluid transport into and out of the piston tube assembly (17) and any volume in fluid communication therewith,
wherein the piston tube assembly (17) further comprises a second tubular body (37) that is made of a different material than the first tubular body (35),
wherein the second tubular body encloses the first tubular body (35) and mechanically supports the first tubular body (35),
wherein the internal breather valve (41) is mounted to the first tubular body (35);
wherein the first tubular body defines at least one lateral ventilation hole in fluid communication with the internal breather valve;
wherein an annular space is defined between the first tubular body and the second tubular body;
wherein the annular space is in fluid communication with at least one lateral opening provided in the second tubular body, wherein fluid can pass through the at least one lateral opening, the annular space, and the at least one lateral ventilation hole from outside of the piston tube assembly.

* * * * *